US009169082B2

(12) United States Patent
Kerschbaumer

(10) Patent No.: US 9,169,082 B2
(45) Date of Patent: Oct. 27, 2015

(54) VARIABLE METERING SYSTEM FOR HETEROGENEOUS, SENSITIVE AND NON-PUMPABLE FOODSTUFFS HAVING A LOW LIQUID PORTION

(75) Inventor: Eric Kerschbaumer, Dreieich (DE)

(73) Assignee: Maschinenfabrik Leonhardt GmbH, Dreieich (DE)

( * ) Notice: Subject to any disclaimer, the term of this patent is extended or adjusted under 35 U.S.C. 154(b) by 0 days.

(21) Appl. No.: 14/128,084

(22) PCT Filed: Jul. 4, 2012

(86) PCT No.: PCT/EP2012/063056
§ 371 (c)(1),
(2), (4) Date: Dec. 20, 2013

(87) PCT Pub. No.: WO2013/004756
PCT Pub. Date: Jan. 10, 2013

(65) Prior Publication Data
US 2014/0140778 A1    May 22, 2014

(30) Foreign Application Priority Data

Jul. 6, 2011 (DE) .......................... 10 2011 051 603

(51) Int. Cl.
*B65B 1/30* (2006.01)
*B65B 1/36* (2006.01)
(Continued)

(52) U.S. Cl.
CPC . *B65G 47/34* (2013.01); *B65B 1/32* (2013.01);
*B65B 1/38* (2013.01); *B65B 37/20* (2013.01);
*B65B 59/04* (2013.01); *G01F 11/18* (2013.01)

(58) Field of Classification Search
CPC ................................. B65B 1/36; B65B 1/363
USPC ......... 222/636, 267, 370, 305, 196, 361, 438,
222/333, 386.5, 152; 406/146, 158; 141/65
See application file for complete search history.

(56) References Cited

U.S. PATENT DOCUMENTS 2,540,259 A * 2/1951 Haugen .......................... 222/307
3,217,944 A * 11/1965 Bell et al. ...................... 222/350
(Continued)

FOREIGN PATENT DOCUMENTS

EP    1698553 A1    9/2006
EP    2066382 A1    6/2009
(Continued)

OTHER PUBLICATIONS

International Search Report for corresponding application PCT/EP2012/063056 mailed Nov. 16, 2012.
(Continued)

*Primary Examiner* — Paul R Durand
*Assistant Examiner* — Charles P Cheyney
(74) *Attorney, Agent, or Firm* — Maier & Maier, PLLC

(57) ABSTRACT

A variable metering system for heterogeneous, sensitive and non-pumpable foodstuffs having a low liquid portion, in which a carrier plate system is set into a stroke motion by a drive cylinder which is in horizontal alignment. The foodstuff, which is brought into the metering chambers on the carrier plates using vacuum, is conveyed by said stroke motion to a discharge position where it is ejected under the effect of compressed air. By the type of connection of the two carrier plates, it is possible to change the distance of the carrier plates from each other by means of a rod system and an associated servomotor or by a hand wheel. This distance variation leads to a change in volume in the metering chambers, can be controlled by an external scale and can be readjusted by an automatic control of the rod system. The design of the metering system ensures that it can be easily dismantled and cleaned for cleaning or maintenance purposes.

7 Claims, 3 Drawing Sheets

(51) Int. Cl.
  *B65G 47/34* (2006.01)
  *B65B 1/38* (2006.01)
  *G01F 11/18* (2006.01)
  *B65B 37/20* (2006.01)
  *B65B 59/04* (2006.01)
  *B65B 1/32* (2006.01)

(56) References Cited

U.S. PATENT DOCUMENTS

| | | | |
|---|---|---|---|
| 3,477,617 A * | 11/1969 | Techtmann | 222/370 |
| 3,602,401 A | 8/1971 | Lense | |
| 4,354,402 A * | 10/1982 | Scott | 74/822 |
| 4,733,803 A | 3/1988 | Sisson et al. | |
| 4,949,766 A * | 8/1990 | Coatsworth | 141/67 |
| 5,082,032 A * | 1/1992 | Crocker | 141/1 |
| 5,244,019 A * | 9/1993 | Derby | 141/65 |
| 5,339,871 A * | 8/1994 | Collins et al. | 141/1 |
| 5,694,741 A * | 12/1997 | Weder et al. | 53/435 |
| 6,612,347 B2 * | 9/2003 | Hill | 141/83 |
| 6,619,339 B2 | 9/2003 | Price et al. | |

FOREIGN PATENT DOCUMENTS

| | | |
|---|---|---|
| GB | 2239442 A | 7/1991 |
| WO | 2008/034506 A1 | 3/2008 |

OTHER PUBLICATIONS

German Office Action dated Mar. 13, 2012, for DE Application No. 10 2011 051 603.4.

* cited by examiner

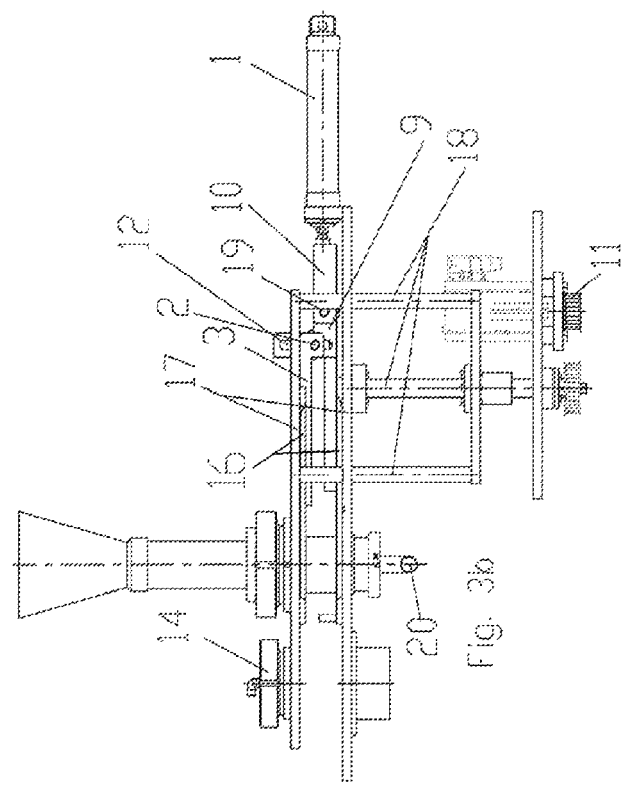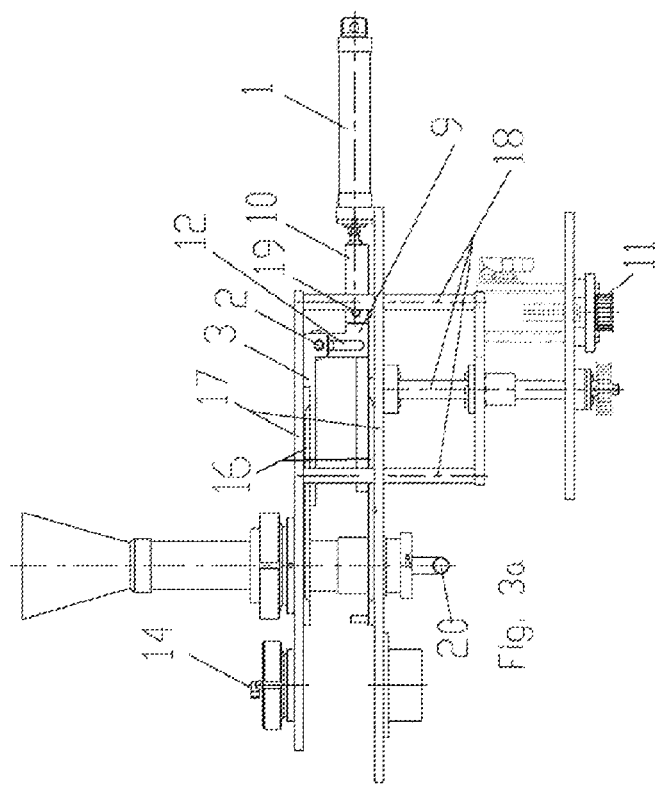
Fig. 3

VARIABLE METERING SYSTEM FOR HETEROGENEOUS, SENSITIVE AND NON-PUMPABLE FOODSTUFFS HAVING A LOW LIQUID PORTION

BACKGROUND OF THE INVENTION

A. Field of the Invention

The invention relates to a variable metering system for heterogeneous, sensitive and non-pumpable media having a low liquid portion which are preferably ready-to-use foodstuffs.

Metering machines are known in principle from the prior art which perform the relevant metering of bulk goods with the assistance of pushing devices, and convey these bulk goods into appropriate packaging units under the effect of gravity.

B. Related Art

By using such pushing devices (U.S. Pat. No. 6,619,339 B2 and U.S. Pat. No. 4,733,803 A), loose or granular bulk goods, such as breakfast cereals, are apportioned and supplied for appropriate further processing or to a packaging unit.

There are some problems in the prior art which cannot be solved by the prior art.

Since permanently installed metering chambers are used, cleaning and servicing are always associated with the complete disassembly of the metering machine. Because of these permanently installed metering chambers, the operating process is restricted to one metering setup; because of the design of the machine, it is only possible to meter a specific amount of foodstuffs corresponding to the metering setup in foodstuffs processing operation.

Furthermore, due to the cascading, fully pneumatic design of the systems corresponding to the prior art, a significant amount of pneumatic components can be assumed which constitute sluggish control sections. Besides, in exclusively pneumatic or hydraulic mode, hygienic working conditions and the simplicity of servicing and cleaning are always an issue.

SUMMARY OF THE DISCLOSURE

The object of the device according to the invention is to establish a metering system that is used in the field of foodstuffs processing and is designed with appropriate materials. Given increasing demand in the the field of food processing, the object also includes maximum system flexibility both in regard to individual volumes as well as the frequency of the cycle with which the individual portions are quickly and cleanly metered. The number of units that can be metered per unit time should generally be adaptable to the respective customer and foodstuffs to be processed in order to ensure maximum efficiency of the metering machine.

The prior art reveals that the metering systems belonging to the prior art are inadequate for exhibiting the desired flexibility in regard to the metering format. This fact is manifested in that there is no option for changing the metering format, and there is no discernible evidence of a variable configuration of the metering volume from to the design of the system.

From the design, it quickly becomes clear however that the prior art frequently comprises cascading, fully-pneumatic dosing machines that are undesirable due to the construction with pneumatic cascade connections since controlling cascading pneumatic connections inevitably leads to complicated system structures that are especially expensive and time-consuming to service, and any troubleshooting is also very difficult.

DESCRIPTION OF THE DRAWINGS

The device according to the invention has precisely these advantages in regard to the design of the metering setups. The exemplary embodiment is depicted in FIGS. 1 to 3 which show:

FIG. 3a) A schematic longitudinal section of the system for varying the metering setup in an initial position.

FIG. 3b) A schematic longitudinal section of the system for varying the metering format in a position having a smaller metering setup in comparison to FIG. 3a.

DETAILED DESCRIPTION OF PREFERRED EMBODIMENTS

Figure 1:
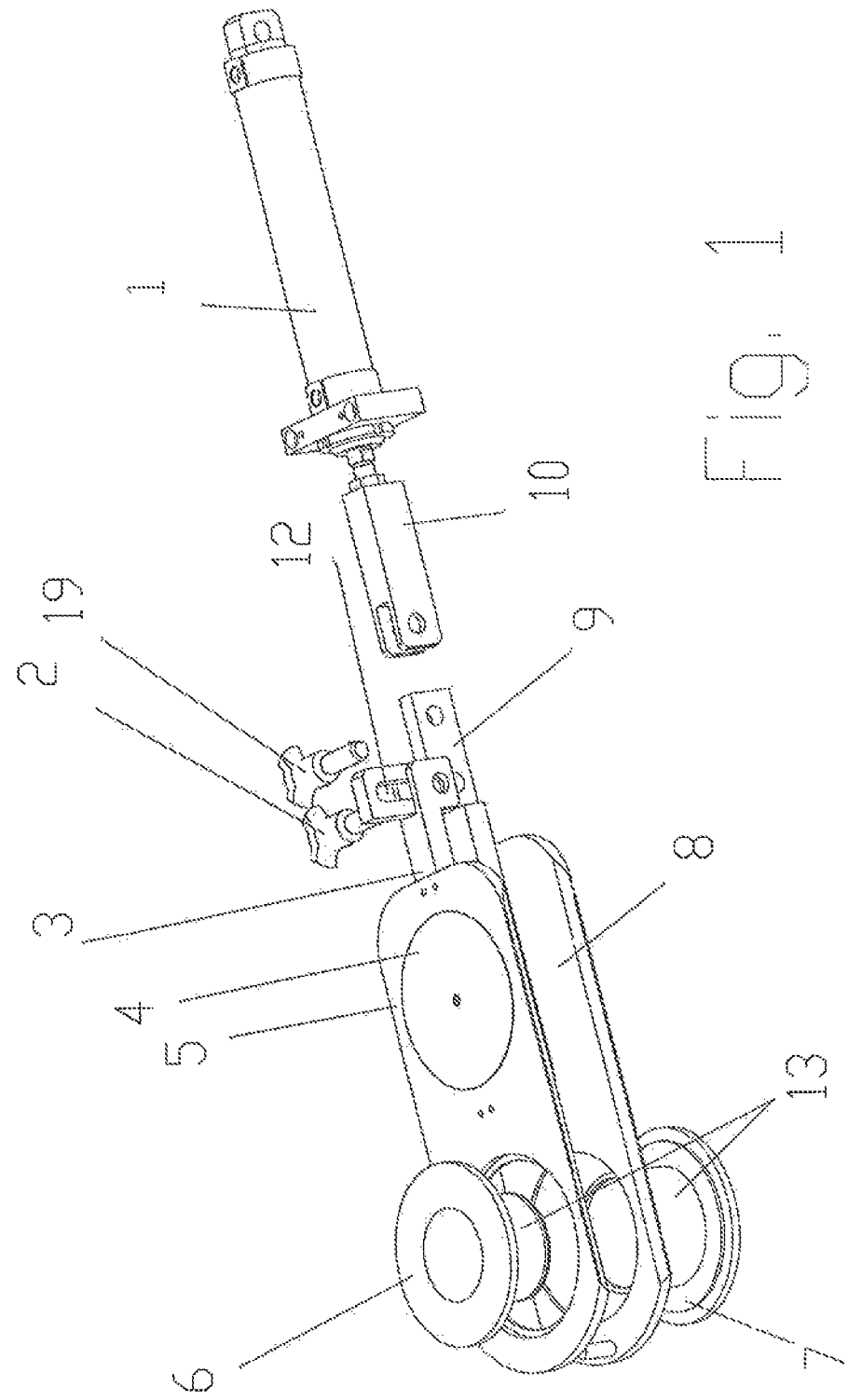
FIG. 1) A perspective, partially exploded drawing of the complete metering setup including drive cylinder 1.

The device according to the invention is operated by a drive cylinder 1 in a linear direction. This drive cylinder 1 can be designed in such a way that it is made up of a tubular chamber or a hollow cylinder and a piston and is, for example, designed as an electromechanical lift cylinder, a pneumatic cylinder or a servocylinder. In any case, the drive cylinder 1 delineates a linear stroke direction that it is guided in a horizontal direction due to its installation position.

The drive cylinder 1 is designed such that a fork head 10 mounted on the end of the stroke cylinder is designed to correspond to the fork head rod system 9 such that, when there is a keyed connection of the fork head 10 with the fork head rod system 9, the rod system can be fixed by means of an appropriate bolt 19.

The bottom part of the support plate 8 that is connected by said keyed connection to the drive cylinder 1 has a vertical slot 12 in which the top guide fork 3 is also connected by means of the connecting bolt 2 to the bottom support plate 8.

This vertical slot 12 is important for varying the metering setup since, given the technical design, the bottom and top support plates 5 are connected to each other; however, the connection is movable in a vertical direction along this slot 12.

The two supports plates 5 and 8 each contain an opening in which the top and bottom metering chamber 6 and 7 are inserted. These metering chambers 6 and 7 are designed such that they are made of a material that is robust, satisfies the hygiene standards of food processing businesses, and are easy to clean. The metering chambers 6 and 7 are in principle geometrically designed so that they contact each other when they are inserted into the respective support plate 5 or 8 and partially overlap. From this perspective, the inner diameter of the top metering chamber 6 is created smaller than the bottom metering chamber 7 so that the top part can be inserted in the bottom part, thus producing a tight, sealed connection between the two metering chamber parts 6 and 7. Together, the two metering chambers 6 and 7 form a hollow cylinder that is characterized by the inner diameter of the smaller metering chamber 7, and this inner diameter is also the basis of the volume, which plays a significant role when operating the device according to the invention. In order to cover the widest possible range of volumes with corresponding metering chamber sizes, the appropriate metering chamber size is preferably available for operating the metering system depending on the application. The preferred metering chamber diameters are 50, 65, 75, 100 and 140 mm, from which the respective volume of the meeting chambers can be inferred.

In addition, the metering chambers 6 and 7 are designed so that they do not flake when they rub against other materials (especially stainless high-grade steel), and the developing temperature does not exceed the tolerated processing temperature of the food to be processed, even after lengthy operation.

The two metering chambers 6 and 7, which are each inserted from below and above into the bottom 8 and top support plates 5, respectively, are connected to each other such that a vertically movable connection that is nonetheless air-tight and liquid-tight is produced between the two metering chambers 6 and 7.

This can be achieved by a corresponding rubber seal 13 between the two metering chambers 6 and 7. To secure the position of the two metering chambers 6 and 7, they are designed so that they fit in the opening in the respective carrier plate 5 or 8, and because of their special geometry, which includes a step of the outer ring, both metering chambers 6 and 7 are affixed to the carrier plates 5 and 8 such that their position cannot slip, and they even retain their original position when used extremely intensely.

In order to avoid unnecessary shear and tension between the carrier plates 5 and 8 and the guide of the carrier plates 5 and 8, a spacer disk is inserted in the respective carrier plate 5 and 8 that promotes the smoothness of the stroke movement and prevents direct contact between two metal surfaces. Due to the typical stroke movement of the support plates 5 and 8, flakes can form without these spacer disks 4 between the carrier plates 5 and 8 and their guide and must be avoided at all costs in food processing businesses since they affect the quality of the products.

Figure 2:
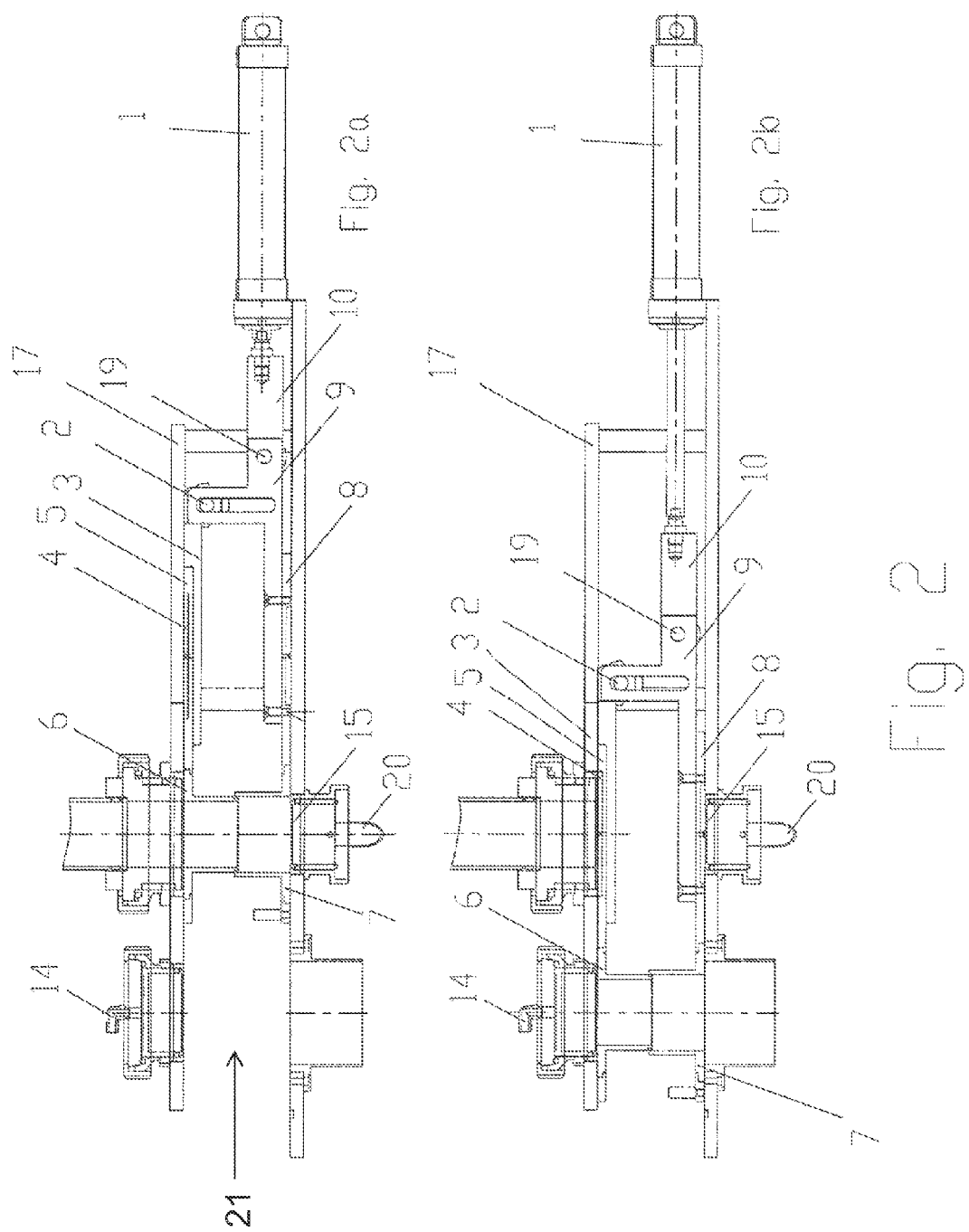
FIG. 2a) A longitudinal section of the metering setup integrated in the system in filling position.
FIG. 2b) A longitudinal section of the metering setup integrated in the system in ejection position.

In addition, the metering system according to the invention possesses airtight connections in the region of the feed 20 of the metering chamber 6 and 7 and in the region of the metered goods discharge 14. As can be seen in FIG. 2a, the purpose of one of the connections is to reliably convey the foodstuffs by means of a corresponding vacuum into the metering chambers 6 and 7. In this position, the metering chambers 6 and 7 are always supplied with the respective foodstuffs, and the supportive feed by means of a vacuum ensures that the metering chambers 6 and 7 are reliably and quickly supplied. By means of corresponding controls, which are primarily carried out by means of a programmable logic controller (PLC), the metering setup is fed from above (FIG. 2a). Via the connection that is located under the metering chambers 6 and 7, a vacuum is supplied to the foodstuffs which are are literally sucked into the metering chambers 6 and 7. By adjusting to the respective volume, it is possible within a very short time to feed the metering chambers 6 and 7 with the precise volume. Using a stable small-mesh sieve 15 or another embodiment permeable to air also ensures that the foodstuffs to be fed remain in the metering chambers 6 and 7 and are not drawn further by the vacuum.

After the metering chambers 6 and 7 have been fed in the position shown in FIG. 2a, the drive cylinder 1 is actuated so that it moves from the feed position by the stroke movement of the drive cylinder 1 into the discharge position (FIG. 2b). By means of the compressed air that acts from above on the foodstuffs, the foodstuffs are discharged by gravity to discharge region 21 (FIG. 2a). The metering setup is returned to the feed position corresponding to the linear stroke movement (FIG. 2a), and the work cycle restarts.

The integrated PLC, which preferably uses a Simatic S7, serves to coordinate the feeding of the metering chambers 6 and 7 as well as to vary the feeding.

The device according to the invention makes it possible to switch between different volumes very quickly and with minimum effort. With the assistance of the described exchangeable metering chambers 6 and 7, a standardized volume change can be realized, or one that corresponds to the inner diameter of the metering chambers 6 and 7. To accomplish this, only the connecting bolts 2 need to be removed, and the two support plates 5 and 8 can be pulled out of their guide rails 16 together and equipped with the corresponding metering chambers 6 and 7. This option of changing the volume offers a significant innovation over the prior art; nevertheless, only a limited volume that exclusively depends on the metering chambers 6 and 7 can be adjusted by means of this measure.

The device according to the invention also offers an additional option of optimally adapting to the requirements for metering the foodstuffs and corresponding packaging. As shown in FIG. 3, the guide rails 16 of the metering chambers 6 and 7 are each on a base plate 17 that is designed to be height-adjustable by means of a rod system 18. By means of this embodiment, the distance between the two base plates 17 can be changed, and the spacing of the support plates 5 and 8 can also be changed via the connection of the base plates 17 to the support plates 5 and 8 of the metering system. Changing the distance between the support plates 5 and 8 causes the height of the cylindrical metering chambers 6 and 7 to also change, and, hence, the volume of the metering chambers 6 and 7 is changed by means of this measure.

Since the height is directly incorporated in the calculation of the volume of a cylinder, a change in volume can be instigated by means of the diameter of the metering chambers 6 and 7 as well as by changing the cylinder height. Given the resulting flexibility in regard to the volume, the metering setup can be easily and quickly adapted depending on the area of use and requirements.

By using in principle a PLC, it is expedient to also automatically control the height adjustment using the PLC. To enter a special volume, the user can enter into the machine the volume that is to be fed, and the PLC sends the user, e.g., a message about which metering chamber setup he needs to enter into the metering setup and, after this exchange has been acknowledged, the height of the support plates 5 and 8 is adjusted so that the combination consisting of the inner diameter of the metering chambers 6 and 7 and the distance between the support plates 5 and 8 precisely corresponds to the desired volume of the metering chambers 6 and 7.

By means of this measure, the metering chamber volume can be gradually changed, and the device according to the invention can at all events be used for any possible volume within a certain range. Although this range is limited by the maximum diameter of the metering chambers 6 and 7 and the maximum distance of the rod system 18, the typical range for metering ready-made meals and foodstuffs in general is completely and entirely covered in any event. The advantageous embodiment of the rod system 18 which can be smoothly adjusted in height provides an adjustable range between 55 mm and 120 mm.

If in fact there is a need to work beyond the normal volume due to a customers particular wish, this can still be achieved with the device according to the invention. Given the simple design of the metering setup, theoretically only the bottom support plate 8 with a correspondingly longer slot 12 needs to be exchanged, and the machine controls adapted to the new setup. Accordingly, precise metering would also be theoretically possible beyond the conventional volume.

In addition to the option of adjusting the height with a servomotor 11, there is also a hand wheel by means of which the height can be manually changed in an emergency.

By using a PLC in regard to calculating and automatically adapting to a specific volume, there are also other very advantageous embodiments. The PLC controls can, for example, be installed in conjunction with a checkweigher. By means of the continuous feedback from the external scale, deviations in the filling weight can be investigated, and the filling weight can be readjusted very quickly and easily by means of the PLC controls and the actuated servomotor 11 so that the existing filling tolerances are not overburdened. This trend control can be fully automated and very fast so that the user does not have to worry about maintaining relevant operating tolerances since these are automatically assumed by the controls.

In principle, the device according to the invention also undergoes cleaning or servicing in food processing businesses at least once daily and correspondingly more frequently when the metered medium is changed, and value is placed on easy disassembly and cleaning of the components in the device according to the invention. All of the connections can be easily undone and reconnected, and the use of small and very small parts is minimized. The advantageous embodiment also reduces servicing times and downtime for the entire system in case of an error since a special tool does not have to be handled, and the individual function groups of the system are very easily identifiable by the user in case of an error.

Of course while the device according to the invention is operating, the user cannot directly come into contact with the moving parts of the metering system. During a cleaning or servicing procedure, the device can, for example, be blocked by the PLC controls to facilitate easy cleaning and servicing; however, the restarting of the machine in normal mode must be separately acknowledged by the user.

REFERENCE NUMBER LIST

1) Drive cylinder
2) Connecting bolt
3) Guide fork, top
4) Spacer disk, top
5) Support plate, top
6) Metering chamber, top
7) Metering chamber, bottom
8) Support plate, bottom
9) Fork head rod system
10) Fork head
11) Servomotor
12) Slot
13) Rubber seal
14) Air-tight compressed air connection
15) Sieve
16) Guide rail
17) Base plate
18) Rod system
19) Bolt
20) Air-tight vacuum connection
21) Discharge region

The invention claimed is:

1. A device for metering heterogeneous, sensitive and non-pumpable foodstuffs having a low liquid portion comprising at least:
   one or more connecting bolts forming a keyed fit between a fork head rod system with a vertical slot and a top guide fork, wherein the keyed fit is nonetheless variable in height along said vertical slot by sliding at least one of the said one or more connecting bolts from a first location within the vertical slot to at least one second location within the vertical slot;
   a drive cylinder that supplies the fork head rod system with an oscillating movement,
   two or more carrier plates that contain centered openings in which exchangeable metering chambers which are insertable in each other can be affixed, wherein the fork head rod system and the top guide fork are each fixed on one of the carrier plates, thereby establishing a mechanical connection to the drive cylinder;
   one or more vertical rod systems that enable changing the distance between the carrier plates by a drive,
   a controllable, airtight vacuum connection that conveys the foodstuffs in the region of the metering chambers into the metering chambers by an applied vacuum in a feed region,
   a controllable, airtight compressed air connection that conveys the foodstuffs in the region of the metering chambers out of the metering chambers by applying pressure in the discharge region.

2. The device according to claim 1, wherein the drive cylinder applies a linear stroke movement to the fork head road system.

3. The device according to claim 1, wherein the carrier plates are guided by corresponding guide rails of a base plate.

4. The device according to claim 1, wherein the two carrier plates are configured to provide appropriate space to the exchangeable metering chambers and are configured so that a sliding connection with the guide rails of the base plate is created on a top one of the carrier plates by use of a spacer disc.

5. The device according to claim 1, wherein the exchangeable metering chambers are configured to have a water-tight and air-tight connection.

6. The device according to claim 1, wherein a change in distance between the carrier plates occurs automatically by the corresponding drive.

7. The device according to claim 6, wherein, the change of the distance between the carrier plates is controlled by a programmable logic controller (PLC).

* * * * *